United States Patent
Taguchi

(10) Patent No.: US 7,145,941 B2
(45) Date of Patent: Dec. 5, 2006

(54) REDUCTION IN POWER CONSUMPTION IN CDMA RECEIVER TERMINAL WHEN SIGNAL IS RECEIVED IN TRANSMISSION DIVERSITY MODE

(75) Inventor: Motoyasu Taguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 1099 days.

(21) Appl. No.: 10/002,202

(22) Filed: Dec. 5, 2001

(65) Prior Publication Data
US 2002/0071410 A1 Jun. 13, 2002

(30) Foreign Application Priority Data
Dec. 12, 2000 (JP) ............... 2000-377363

(51) Int. Cl.
*H04B 1/69* (2006.01)
(52) U.S. Cl. .................. 375/148; 375/147; 370/335
(58) Field of Classification Search ............. 375/130, 375/345, 267, 299; 455/132, 133, 134, 137, 455/506, 125, 343; 370/335, 342, 441
See application file for complete search history.

(56) References Cited

U.S. PATENT DOCUMENTS 5,652,764 A 7/1997 Kanzaki et al.
5,842,037 A 11/1998 Haartsen
6,600,907 B1 * 7/2003 Taguchi .................. 455/132

FOREIGN PATENT DOCUMENTS

| EP | 0 813 313 A2 | | 12/1997 |
|---|---|---|---|
| GB | 2 345 416 | * | 7/2000 |
| JP | 11-168447 | | 6/1999 |
| JP | 11-177524 | | 7/1999 |
| JP | 2000-124847 | | 4/2000 |
| JP | 2000-138654 | | 5/2000 |
| JP | 2000-174729 | | 6/2000 |

OTHER PUBLICATIONS

L. Yue, "Analysis of Generalized Selection Combining Techniques", VTC 2000, IEEE 51st Vehicular Technology Conference Proceedings, (May 15-18, 2000), pp. 1191-1195.

* cited by examiner

*Primary Examiner*—Tesfaldet Bocure
*Assistant Examiner*—Sudhanshu C. Pathak
(74) *Attorney, Agent, or Firm*—Sughrue Mion, PLLC

(57) ABSTRACT

A CDMA receiver terminal comprises a finger circuit for correcting the phase of inverse spread data for signals from two antennas of a base station, and the finger circuit in turn has a level measuring circuit for determining the validity of the two signals. The level measuring circuit, when determining that any of the received signals from the two antennas of the base station is invalid, stops supplying an operating clock from a clock supply circuit to a phase corrector circuit which corrects the phase of the signal determined as invalid.

4 Claims, 6 Drawing Sheets

REDUCTION IN POWER CONSUMPTION IN CDMA RECEIVER TERMINAL WHEN SIGNAL IS RECEIVED IN TRANSMISSION DIVERSITY MODE

BACKGROUND OF THE INVENTION

1. Field of the Invention

The present invention relates to a CDMA receiver terminal for use in a CDMA communications system, and more particularly, to a CDMA receiver terminal for receiving a signal transmitted by a base station using two antennas in a transmission diversity mode.

2. Description of the Related Art

Conventionally, some CDMA communications systems have employed a method of transmitting signals from a base station to a receiver terminal as illustrated in FIG. 1, wherein base station 1 uses two antennas ANT1, ANT2 to transmit signals A, B to a receiver terminal 2 (hereinafter called the "transmission diversity mode").

Receiver terminal 2 inversely spreads the signals transmitted from respective antennas ANT1, ANT2 of base station 1 in finger unit (inverse spreader unit), corrects the signals for the phase in finger unit (phase corrector unit), and then combines the resulting signals in RAKE circuit. Finger unit (inverse spreader unit) and finger unit (phase corrector unit) each comprises a plurality of finger circuits, each of which performs the foregoing operation at a predetermined operating clock. Each of the finger circuits in finger unit (inversely spreader circuit) corrects the timing of the operating clock based on a timing control pulse signal applied from a timing corrector circuit (not shown) provided externally to receiver terminal 2.

Now, the configuration of each finger circuit in finger unit (phase corrector unit) provided in the conventional CDMA receiver terminal will be described with reference to FIG. 2.

Referring to FIG. 2, the finger circuit of the prior art example comprises phase estimator circuit 17, phase corrector circuits 18, 19, and antenna combiner circuit 20. Each of the components operates based on an operating clock supplied from TCXO (Temperature Compensated Crystal Oscillator) 16.

Phase estimator circuit 17 estimates the amounts of phase correction for signals received from antenna ANT1, ANT2 from base station 1 (see FIG. 1) based on a difference in phase between I, Q phase points of known expected data and inverse spread data inversely spread in finger unit (inverse spreader unit) at the previous stage. Phase estimator circuit 17 also applies the inverse spread data inversely spread in finger unit (inverse spreader unit) to phase corrector circuits 18, 19.

Phase corrector circuit 18 corrects the phase of the inverse spread data for the received signal from antenna ANT1 of base station 1, out of the inverse spread data applied from phase estimator circuit 17, by the amount of phase correction estimated by phase estimator circuit 17. Phase corrector circuit 19 corrects the phase of the inverse spread data for the received signal from antenna ANT2 of base station 1, out of the inverse spread data applied from estimator circuit 17, by the amount of phase correction estimated in phase estimator circuit 17. Each of phase corrector circuits 18, 19 applies the phase-corrected inverse spread data to antenna combiner circuit 20.

Antenna combiner circuit 20 combines the phase-corrected inverse spread data applied from respective phase corrector circuits 18, 19.

In the conventional CDMA receiver terminal as described above, however, since the finger unit (phase corrector unit) and timing corrector circuit are operating irrespective of the validity of received signals transmitted from respective antennas ANT1, ANT2 of base station 1, there is a problem that this constitutes a factor of increasing the power consumption.

SUMMARY OF THE INVENTION

It is an object of the present invention to provide a CDMA receiver terminal which is capable of reducing the power consumption when a base station is transmitting signals.

The present invention determines the validity for respective received signals transmitted from two antennas of a base station, and stops supplying an operating clock to a phase corrector circuit which corrects the phase of a signal from an antenna that is determined to be invalid. Thus, the power consumption can be reduced while the base station is transmitting the signals.

Also, when both of the signals transmitted respectively from the two antennas of the base station are determined to be invalid, the supply of the operating clock is also stopped to a timing corrector circuit which applies a signal for correcting the timing of the operating clock. It is therefore possible to further reduce the power consumption when the base station is transmitting the signals.

The above and other objects, features and advantages of the present invention will become apparent from the following description with reference to the accompanying drawings which illustrate examples of the present invention.

DESCRIPTION OF THE PREFERRED EMBODIMENT

Figure 1:
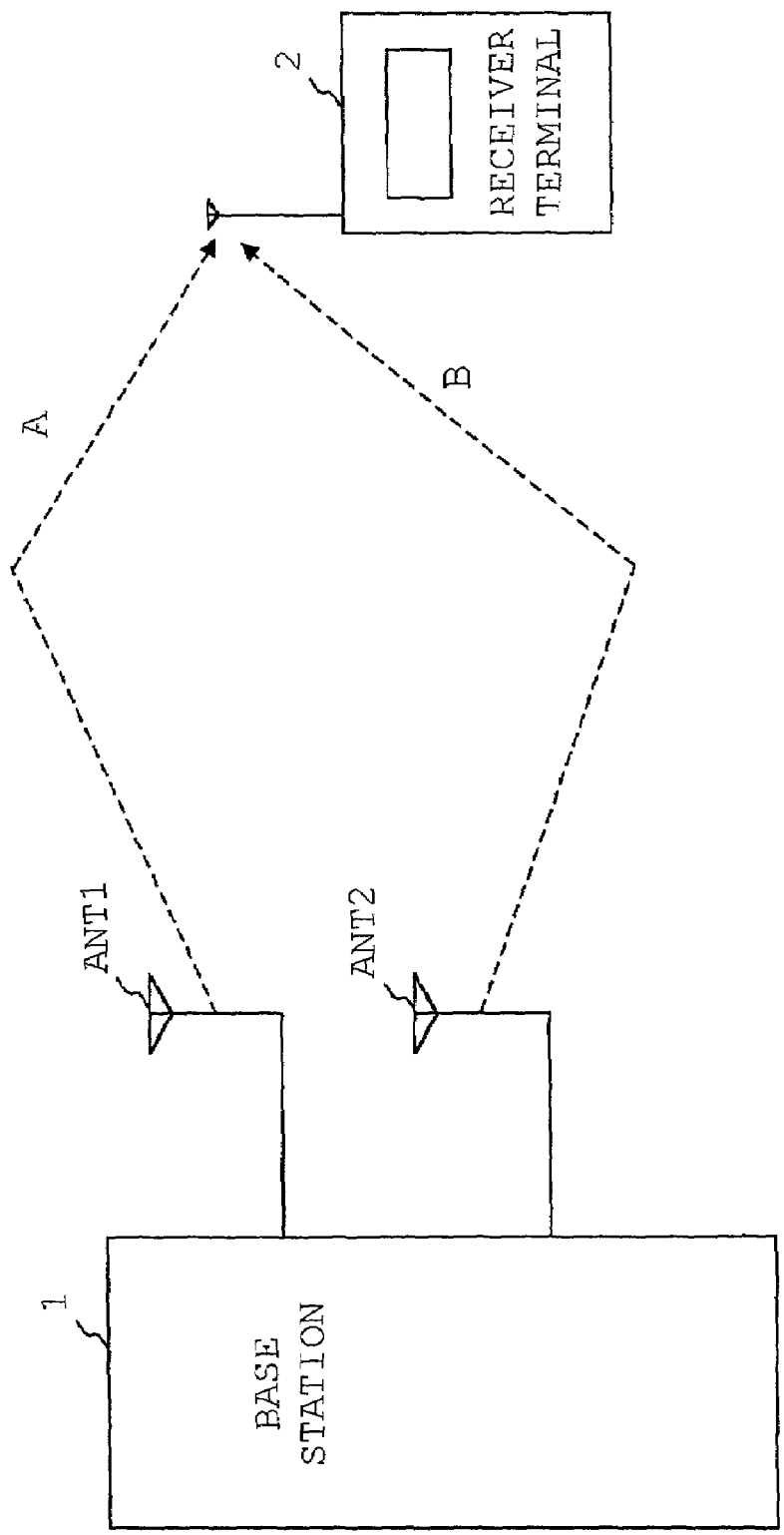
FIG. 1 is a block diagram illustrating an exemplary CDMA communications system where signals are transmitted from a base station to a receiver terminal in a transmission diversity mode.
Figure 2:
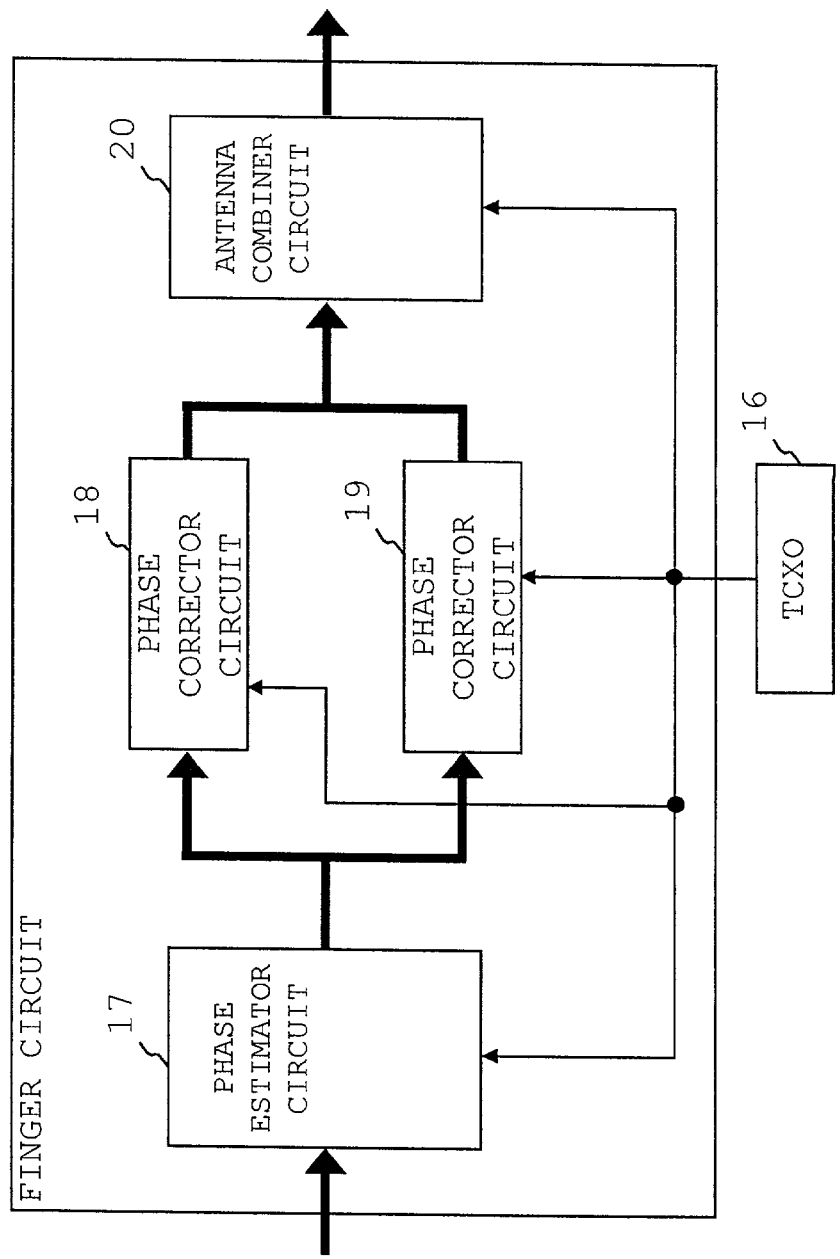
FIG. 2 is a block diagram illustrating an exemplary configuration of each finger circuit provided in a finger unit (phase corrector unit) used in a conventional CDMA receiver terminal.
Figure 3:
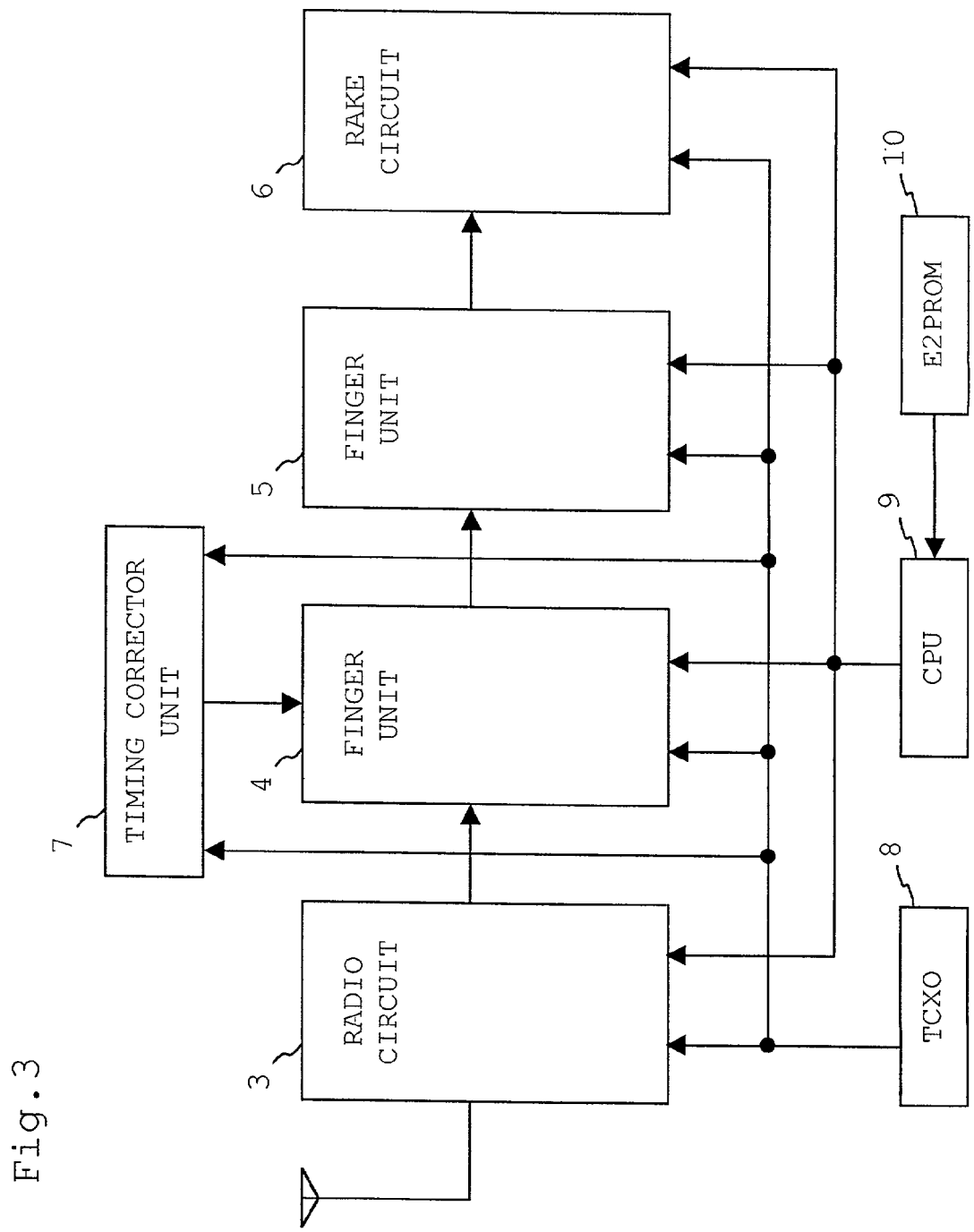
FIG. 3 is a block diagram illustrating a CDMA receiver terminal according to one embodiment of the present invention.

Referring to FIG. 3, there is illustrated a CDMA receiver terminal according to one embodiment of the present invention which comprises radio circuit 3; inverse spreader finger unit (inverse spreader unit) 4; phase corrector finger unit (phase corrector unit) 5; RAKE circuit 6; timing corrector unit 7; TCXO 8; CPU 9; and E2PROM 10. It should be noted that the following description will be made on the assumption that the CDMA receiver terminal illustrated in FIG. 3 receives signals transmitted from two antennas ANT1, ANT2 of base station 1 in a transmission diversity mode, as illustrated in FIG. 1.

TCXO 8 supplies an operating clock to radio circuit 3, finger unit 4, finger unit 5, RAKE circuit 6, and timing corrector circuit 7. These components respectively perform predetermined operations based on the operating clock supplied from TCXO 8.

Radio circuit 3 receives signals transmitted from antennas ANT1, ANT2 of base station 1 in a transmission diversity mode, and applies the signals to finger unit 4.

Timing corrector circuit 7 applies finger unit 4 with a timing control pulse signal for correcting the operating timing in finger unit 4.

Finger unit 4 fetches received signals applied from radio circuit 3 in response to the timing control pulse signal from timing corrector circuit 7, inversely spreads the fetched received signals to demodulate inverse spread data in symbols, and applies this inverse spread data to finger unit 5.

Finger unit 5 separates the inverse spread data applied from finger unit 4 into inverse spread data for a received signal from antenna ANT1 of base station 1 and inverse spread data for a received signal from antenna ANT2 of base station 1 for phase correction. Finger unit 5 also measures the level of an electric field generated by the received signal from antenna ANT1 of base station 1 and the level of an electric field generated by the received signal from antenna ANT2 of base station 1, determines that the received signal from the associated antenna is invalid if the measured electric field level is below a predetermined threshold, and stops the operating clock supplied to a particular one of circuits within finger unit 5 which is allocated to correct the phase of the received signal from the antenna which is determined as invalid.

Figure 4:
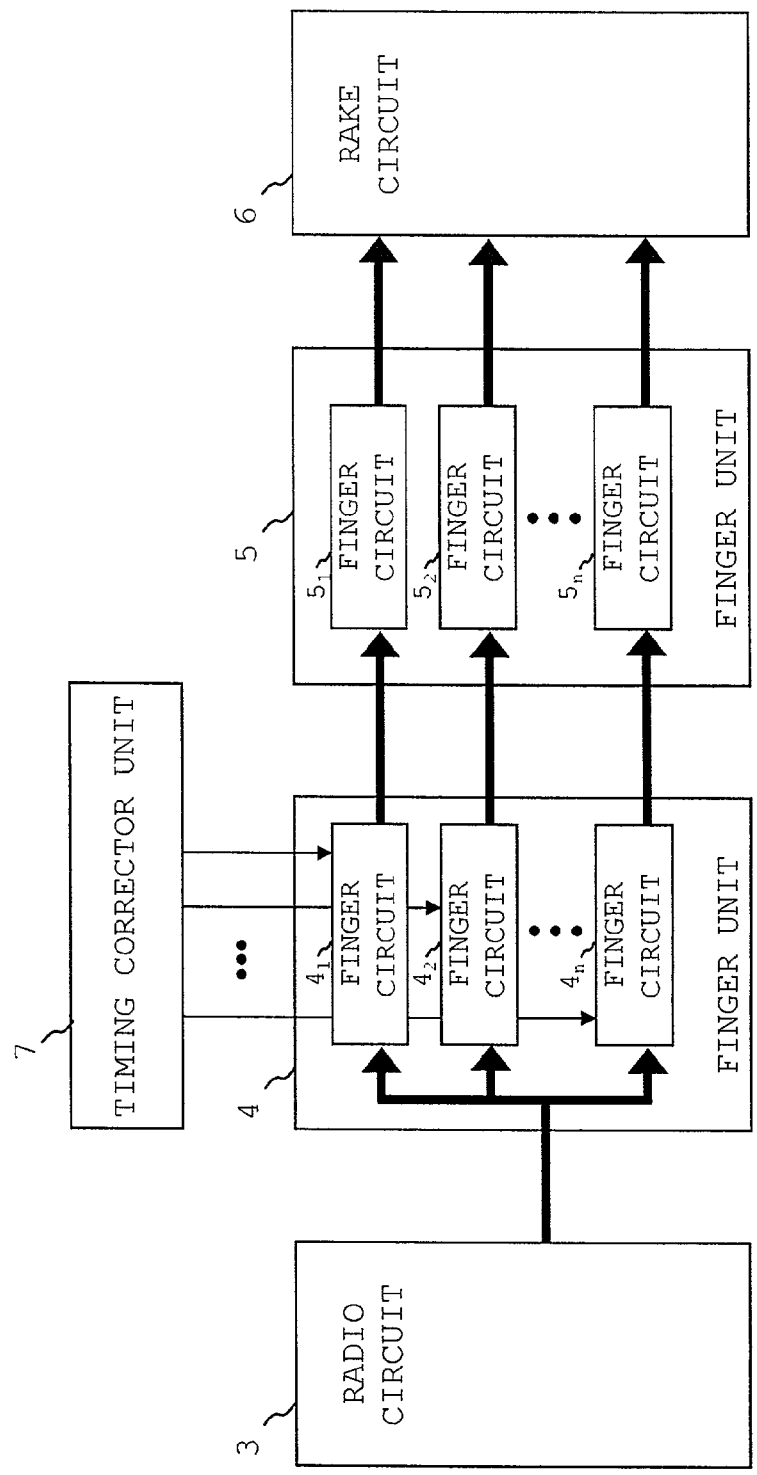
FIG. 4 is a block diagram illustrating the configuration of a finger unit in the CDMA receiver terminal illustrated in FIG. 3.

Referring to FIG. 4, finger unit 4 is composed of finger circuits $4_1$–$4_n$, while finger unit 5 is composed of finger circuits $5_1$–$5_n$. Also, respective finger circuits $4_1$–$4_n$ perform the aforementioned operation at timings different from one another, triggered by a timing control pulse signal applied from timing corrector circuit 7.

RAKE circuit 6 combines inverse spread data which have been corrected for the phase in respective finger circuits $5_1$–$5_n$ of finger unit 5.

E2PROM 10 stores a variety of known data including threshold data used in finger unit 5.

CPU 9 instructs radio circuit 3, respective finger circuits $4_1$–$4_n$ within finger unit 4, respective finger circuits $5_1$–$5_n$ within finger unit 5, and RAKE circuit 6 to perform the aforementioned operation, and fetches a variety of data from E2PROM 10.

Figure 5:
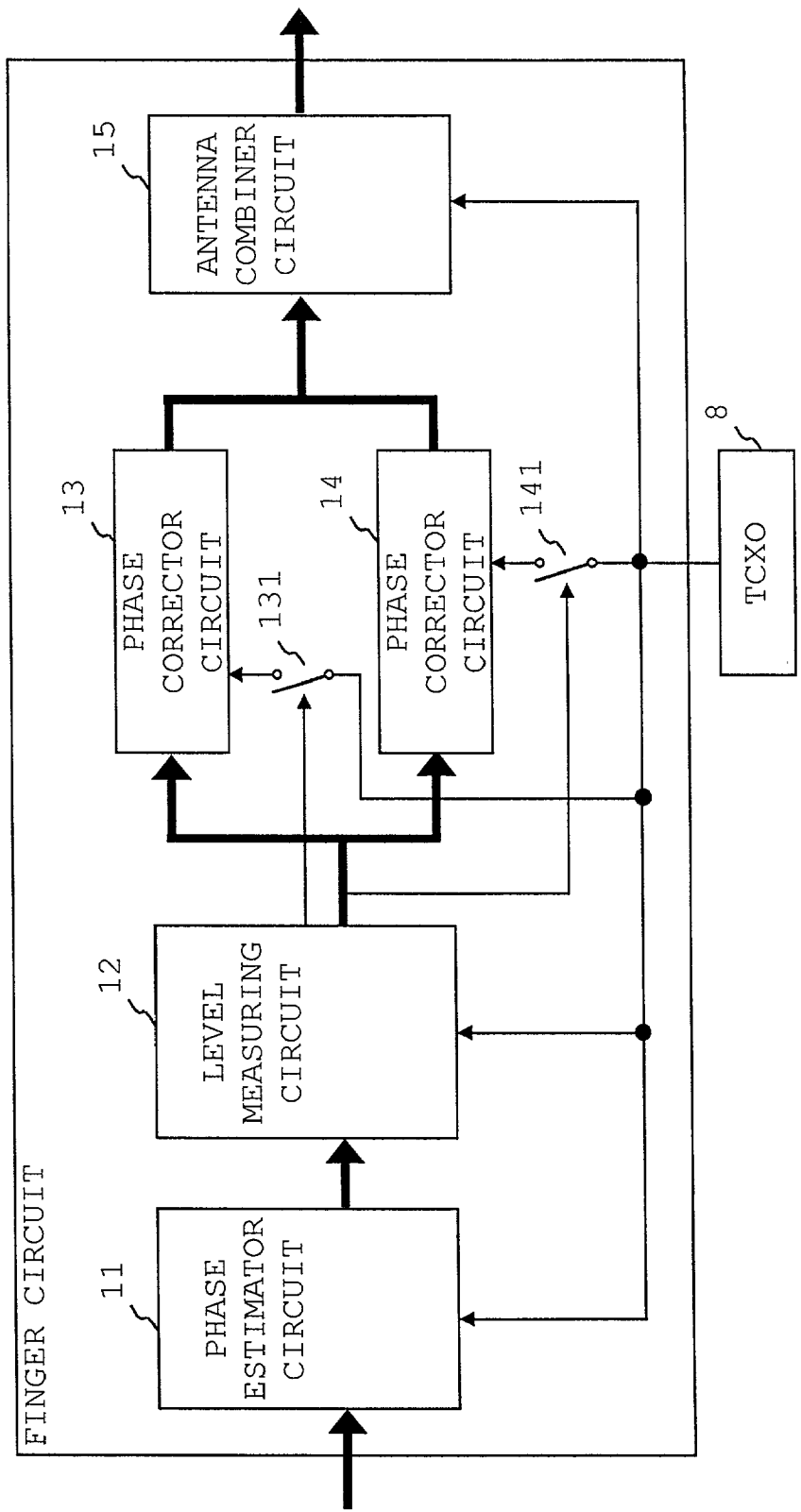
FIG. 5 is a block diagram illustrating an exemplary configuration of each finger circuit provided in a finger unit (phase corrector unit) illustrated in FIG. 4.

Referring to FIG. 5, each finger circuit $5_1$–$5_n$ comprises phase estimator circuit 11, level measuring circuit 12, phase corrector circuits 13, 14, antenna combiner circuit 15, and switches 131, 141. Each of these components performs a predetermined operation based on the operating clock supplied from TCXO 8.

Phase estimator circuit 11 calculates a difference in phase between I, Q phase points of known expected data and inverse spread data applied from each of finger circuits $4_1$–$4_n$ in finger unit 4 to estimate how many degrees phase estimator circuit 11 corrects the phase of a received signal from each antenna ANT1, ANT2 of base station 1.

Specifically, phase estimator circuit 11 calculates a fading vector (a parameter indicative of a shift in the phase of inverse spread data from the I, Q phase points of expected data) for a received signal from each antenna ANT1, ANT2 of base station 1 based on inverse spread data applied thereto from finger circuits $4_1$–$4_n$ within finger unit 4, and applies the calculated fading vector to level measuring circuit 12. Phase estimator circuit 11 also applies level measuring circuit 12 with inverse spread data applied from finger circuits $4_1$–$4_n$.

Level measuring circuit 12 measures the level of an electric field generated by the received signal from antenna ANT1 of base station 1, and the level of an electric field generated by the received signal from antenna ANT2 of base station 1 based on the fading vector fed thereto from phase estimator circuit 11, and compares the measured electric field levels with a predetermined threshold to determine the validity for the received signal from antenna ANT1 and the validity for the received signal from antenna ANT2, respectively. Level measuring circuit 12 also applies a control signal for turning ON/OFF switches 131, 141 disposed between respective phase corrector circuits 13, 14 and TCXO 8 based on the result of determination. Level measuring circuit 12 further applies the inverse spread data and fading vector fed from phase estimator circuit 11 to each of phase corrector circuits 13, 14.

Level measuring circuit 12 determines the validity for received signals from respective antennas ANT1, ANT2 at regular time intervals, convenient for the particular system, for example, at intervals of one frame (10 ms) in a CDMA communications system.

Phase corrector circuit 13 corrects the phase of inverse spread data for the received signal from antenna ANT1 of base station 1 out of the inverse spread data applied from level measuring circuit 12 based on the fading vector fed from level measuring circuit 12. Phase corrector circuit 14 corrects the phase of inverse spread data for the received signal from antenna ANT2 of base station 1 out of the inverse spread data applied from level measuring circuit 12 based on the fading vector fed from level measuring circuit 12.

Each of phase corrector circuits 13, 14 is connected to TCXO 8 through switch 131, 141 which is turned ON/OFF in response to a control signal applied thereto from level measuring circuit 12, and corrects the phase of the inverse spread data for the received signal from the associated antenna only when it is supplied with the operating clock from TCXO 8 through switch 131, 141 which is turned ON. Then, each of phase corrector circuits 13, 14 applies antenna combiner circuit 15 with the phase-corrected inverse spread data.

Antenna combiner circuit 15 combines the phase-corrected inverse spread data applied thereto from respective phase corrector circuits 13, 14 associated with antennas ANT1, ANT2, and applies the combined inverse spread data to RAKE circuit 6.

Figure 6:
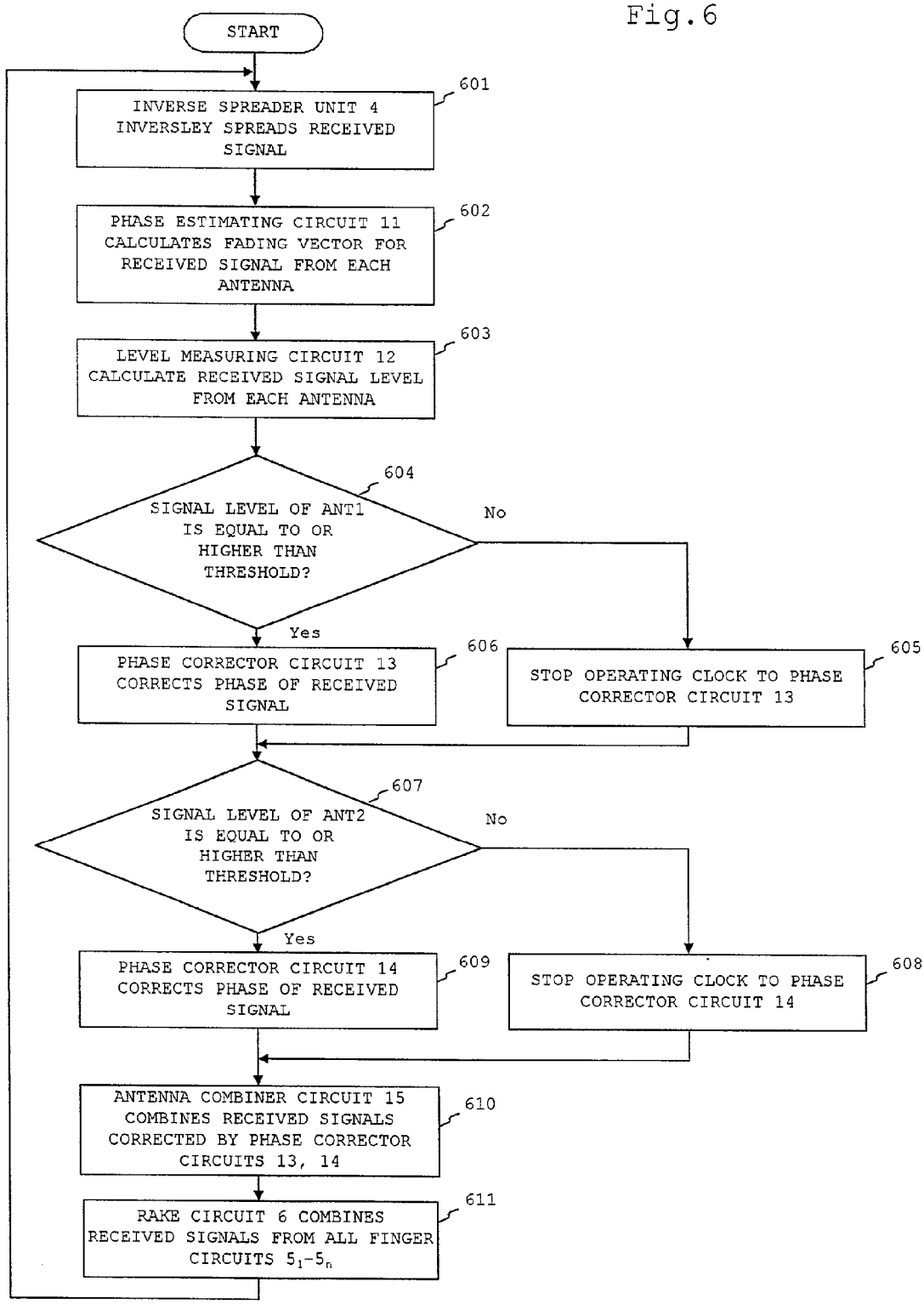
FIG. 6 is a flow chart for explaining the operation of the CDMA receiver terminal illustrated in FIGS. 3 and 4.

Next, the operation involved in reducing the power consumption in the CDMA receiver terminal in accordance with this embodiment will be described with reference to FIG. 6.

First, at step 601, each of finger circuits $4_1$–$4_n$ provided in finger unit 4 inversely spreads a received signal applied from radio circuit 3 to demodulate the received signal to inverse spread data in symbols which are applied to each of finger circuits $5_1$–$5_n$ provided in finger unit 5. At this time, each of finger circuits $4_1$–$4_n$ is triggered by a timing control pulse signal applied thereto from timing corrector circuit 7 to inversely spread the received signal at different timings from one another.

In each of finger circuits $5_1$–$5_n$, at step 602, phase estimator circuit 11 calculates a fading vector for the received signal from each antenna ANT1, ANT2 of base station 1 based on the inverse spread data applied thereto from each of finger circuits $4_1$–$4_n$ within finger unit 4, and supplies level measuring circuit 12 with the calculated fading vectors and the inverse spread data applied from finger circuits $4_1$–$4_n$.

Next, at step 603, level measuring circuit 12 measures the level of an electric field generated by the received signal from antenna ANT1 of base station 1, and the level of an electric field generated by the received signal from antenna ANT2 of base station 1, respectively, based on the fading vectors fed from phase estimator circuit 11, and applies respective phase corrector circuits 13, 14 with the fading vectors and inverse spread data applied from phase estimator circuit 11.

Further, at step 604, level measuring circuit 12 first compares the level of the electric field generated by the received signal from antenna ANT1 of base station 1 with a predetermined threshold to determine the validity for the received signal from antenna ANT1. The threshold used in the comparison is retrieved from E2PRM 10 and applied to level measuring circuit 12 within each finger circuit $5_1$–$5_n$ under control of CPU 9.

When the electric field level is below the threshold at step 604, level measuring circuit 12 determines at step 605 that the received signal from antenna ANT1 is invalid, applies switch 131 disposed between phase corrector circuit 13 and TCXO 8 with a control signal at "0" for turning OFF switch 131, thereby stopping the operating clock supplied to phase corrector circuit 13.

Conversely, when the electric field level is equal to or higher than the threshold at step 604, level measuring circuit 12 determines at step 606 that the received signal from antenna 1 is valid, and applies switch 131 disposed between phase corrector circuit 13 and TCXO 8 with the control signal at "1" for maintaining switch 131 ON. Thus, phase corrector circuit 13 corrects the phase of the inverse spread data for the received signal from antenna ANT1, out of the inverse spread data applied from level measuring circuit 12, based on the fading level applied from level measuring circuit 12.

Subsequently, in a manner similar to the foregoing processing at steps 604–606, level measuring circuit 12 compares the level of an electric field generated by the received signal from antenna ANT2 of base station 1 to determine the validity for the received signal from antenna ANT2 at step 607. Upon determining that the received signal from antenna ANT2 is invalid, the operating clock supplied to phase corrector circuit 14 is stopped at step 608. Conversely, upon determining that the received signal from antenna ANT2 is valid, phase corrector circuit 14 corrects the phase of the inverse spread data for the received signal from antenna ANT2 at step 609.

Next, at step 610, antenna combiner circuit 15 combines the phase-corrected inverse spread data in respective phase corrector circuits 13, 14.

Subsequently, at step 611, RAKE circuit 6 combines the inverse spread data which have been combined by antenna combiner circuits 15 in respective finger circuits $5_1$–$5_n$.

As described above, in the foregoing embodiment, when base station 1 is transmitting signals using two antennas ANT1, ANT2 in the transmission diversity mode, level measuring circuit 12 determines the level of an electric field generated by a received signal from each of antennas ANT1, ANT2, and when the electric field level is below the threshold, generates the control signal for stopping the operating clock supplied to one of phase corrector circuits 13, 14 which is correcting the phase of the received signal from the associated antenna.

Consequently, the operation of the associated phase corrector circuit is stopped, thereby making it possible to reduce the power consumption.

Also, in the foregoing embodiment, when the validity for the received signal either from antenna ANT1 or ANT2 of base station 1 is not recognized from the result of comparison, made by level measuring circuit 12, of the level of the electric field generated by the received signal from each antennas ANT1, ANT2 with the threshold, CPU 9 can control to stop the operating clock supplied to timing corrector circuit 7 as well as the operating clock supplied to associated phase corrector circuit 13 or 14.

Referring again to FIG. 4, each of finger circuits $4_1$–$4_n$ within finger unit 4 is operating, triggered by the timing control pulse signal applied from timing corrector circuit 7. However, when the validity is not recognized for the received signal either from antenna ANT1 or ANT2 of base station 1, it can be regarded that the timing control pulse signal allocated to associated finger circuits $4_1$–$4_n$ does not provide a proper timing for causing those finger circuits to inversely spread the received signals.

In this situation, therefore, not only the operating clock supplied to the associated phase corrector circuit is stopped, but the operating clock to timing corrector circuit 7 is stopped for a certain time period. Since this can stop the operation of the associated phase corrector circuit and timing corrector circuit 7, the power consumption can be further reduced.

While preferred embodiments of the present invention have been described using specific terms, such description is for illustrative purposes only, and it is to be understood that changes and variations may be made without departing from the spirit or scope of the following claims.

What is claimed is:

1. A CDMA receiver terminal comprising:
   a plurality of first finger means each for inversely spreading signals transmitted from a base station using two antennas in a transmission diversity mode for demodulating the signals; and
   a plurality of second finger means each combined with each of said plurality of first finger means, each of said second finger means including:
   means for separating inverse spread data for the signal inversely spread by said first finger means into inverse spread data for a signal transmitted from one antenna of said base station and inverse spread data for a signal transmitted from the other antenna of said base station, and for correcting the phase of the respective inverse spread data; and
   means for determining the validity for the signals respectively transmitted from the two antennas of said base station and for stopping the supply of an operating clock to said means for correcting the phase of inverse spread data for a signal which is determined as invalid.

2. The CDMA receiver terminal according to claim 1, wherein each said second finger means includes means for determining the validity for a signal transmitted from each antenna of said base station based on the level of an electric field generated by the signal.

3. The CDMA receiver terminal according to claim 2, further comprising:
   timing correcting means for generating a timing control pulse signal for correcting the timing of an operating clock of each said first finger means to apply the timing control pulse signal to said first finger means;

clock supplying means for supplying the operating clock to said first finger means, said second finger means and said timing correcting means; and means for stopping supplying said timing correcting means with the operating clock from said clock supplying means when said second finger means determines that both signals transmitted from the two antennas of said base station are invalid.

4. The CDMA receiver terminal according to claim 3, wherein each said second finger means includes:

phase estimating means for calculating a fading vector which is a parameter indicative of a shift in phase from I, Q phase points of expected data for each of the signals transmitted from the two antennas of said base station, based on the inverse spread data for the signals inversely spread by said respective first finger means;

first phase correcting means connected to said clock supplying means through a first switch for correcting the phase of inverse spread data for a signal transmitted from one antenna of said base station, out of the inverse spread data for the signals inversely spread by said respective first finger means, based on the fading vectors calculated by said phase estimating means;

second phase correcting means connected to said clock supplying means through a second switch for correcting the phase of inverse spread data for a signal transmitted from the other antenna of said base station, out of the inverse spread data for the signals inversely spread by said respective first finger means, based on the fading vectors calculated by said phase estimating means;

antenna combining means for combining the inverse spread data corrected for the phase by each of said first and second phase correcting means; and level measuring means for measuring the level of an electric field generated by each of the signals transmitted from the two antennas of said base station based on the fading vector calculated by said phase estimating means, comparing the measured electric field level with a predetermined threshold to determine the validity for each of the signals transmitted from the two antennas of said base station, and when determining that any of the signals from the two antennas of said base station is invalid, turning OFF said first or second switch which connects said first or second phase correcting means for correcting the phase of the signal determined as invalid with said clock supply means.

* * * * *